US012560936B2

(12) United States Patent
Barnhart et al.

(10) Patent No.: US 12,560,936 B2
(45) Date of Patent: Feb. 24, 2026

(54) SYSTEMS AND METHODS FOR OBJECT DETECTION

(71) Applicant: Crown Equipment Corporation, New Bremen, OH (US)

(72) Inventors: Brent Barnhart, Van Wert, OH (US); Jeremy Koppenhaver, Botkins, OH (US); Herb Hollinger, Mt. Vernon, IN (US)

(73) Assignee: Crown Equipment Corporation, New Bremen, OH (US)

( * ) Notice: Subject to any disclaimer, the term of this patent is extended or adjusted under 35 U.S.C. 154(b) by 229 days.

(21) Appl. No.: 18/178,308

(22) Filed: Mar. 3, 2023

(65) Prior Publication Data

US 2023/0280754 A1     Sep. 7, 2023

Related U.S. Application Data

(60) Provisional application No. 63/316,620, filed on Mar. 4, 2022.

(51) Int. Cl.
*G05D 1/00*          (2024.01)

(52) U.S. Cl.
CPC ........... *G05D 1/0223* (2013.01); *G05D 1/028* (2013.01); *G05D 1/0238* (2013.01); (Continued)

(58) Field of Classification Search
CPC .... G05D 1/0223; G05D 1/028; G05D 1/0238; G05D 1/0246; G05D 1/0255; (Continued)

(56) References Cited

U.S. PATENT DOCUMENTS

| | | |
|---|---|---|
| 9,571,985 B2 | 2/2017 | Botttazzi et al. |
| 11,275,151 B2 | 3/2022 | Grabbe et al. |

(Continued)

FOREIGN PATENT DOCUMENTS

| | | |
|---|---|---|
| CN | 110228677 A | 9/2019 |

OTHER PUBLICATIONS

Notification of Transmittal of the International Search Report and Written Opinion of the International Searching Authority, or the Declaration dated Jun. 27, 2023 pertaining to International application No. PCT/US2023/014457 filed Mar. 3, 2023, pp. 1-12.

*Primary Examiner* — Faris S Almatrahi
*Assistant Examiner* — Dana F Artimez
(74) *Attorney, Agent, or Firm* — Dinsmore & Shohl LLP

(57)          ABSTRACT

Embodiments provided herein include systems and methods for object detection in an environment. One embodiment of a system includes a vehicle with a wireless communication receiver for receiving communication from a wireless communication transmitter that is placed on a first object and a computing device that includes a memory component and a processor. The memory component may store logic that causes the system to receive a communication from the wireless communication transmitter, receive proximity data related to a second object, and determine a second location of the second object. Some embodiments cause the system to determine a control zone along a current path of the vehicle based on a speed of the vehicle, and in response to determining that at least one of the following enters the control zone: the first object or the second object, reduce the speed of the vehicle.

20 Claims, 6 Drawing Sheets

(52) U.S. Cl.
CPC ......... *G05D 1/0246* (2013.01); *G05D 1/0255* (2013.01); *G05D 1/0257* (2013.01)

(58) Field of Classification Search
CPC ..... G05D 1/0257; B66F 17/003; G01S 17/42; G01S 2013/93185; G01S 13/931; G01S 15/86; G01S 15/931; G01S 17/86; G01S 13/86; G01S 17/931
See application file for complete search history.

(56) References Cited

U.S. PATENT DOCUMENTS

| | | | | |
|---|---|---|---|---|
| 2010/0114405 A1 * | 5/2010 | Elston | .................. | G05D 1/0212 |
| | | | | 701/1 |
| 2010/0289662 A1 * | 11/2010 | Dasilva | .................. | G01V 15/00 |
| | | | | 340/686.6 |
| 2011/0093134 A1 * | 4/2011 | Emanuel | .............. | G05D 1/0297 |
| | | | | 701/2 |
| 2012/0239224 A1 | 9/2012 | McCabe et al. | | |
| 2013/0275045 A1 * | 10/2013 | Tsujimoto | ............ | G05D 1/0297 |
| | | | | 701/517 |
| 2014/0365104 A1 | 12/2014 | Sasaki | | |
| 2018/0330618 A1 * | 11/2018 | Bai | ......................... | B60K 35/29 |
| 2019/0137991 A1 * | 5/2019 | Agarwal | .............. | G01C 21/383 |
| 2021/0087031 A1 * | 3/2021 | Lunscher | ............. | G05D 1/0297 |
| 2021/0213983 A1 * | 7/2021 | Yamazaki | ............ | B61L 23/041 |
| 2021/0261119 A1 * | 8/2021 | Nakamura | ........... | B60W 30/09 |
| 2023/0142252 A1 * | 5/2023 | Bergquist | ........... | B60W 40/105 |
| | | | | 701/23 |

* cited by examiner

75%

TRUCK DETECTED – TRAVEL SPEED LIMITED

330

334

336

332

START

RECEIVE A WIRELESS COMMUNICATION    550

DETERMINE A FIRST LOCATION OF THE FIRST OBJECT    552

RECEIVE PROXIMITY DATA OF THE SECOND OBJECT    554

DETERMINE A SECOND LOCATION OF THE SECOND OBJECT    556

DETERMINE A SPEED OF THE VEHICLE    558

DETERMINE A CONTROL ZONE OF THE VEHICLE    560

IN RESPONSE TO DETECTING AN OBJECT IN THE CONTROL ZONE, REDUCE SPEED OF THE VEHICLE    562

END

SYSTEMS AND METHODS FOR OBJECT DETECTION

CROSS REFERENCE

This application claims the benefit of U.S. Provisional Application Ser. No. 63/316,620, Filed Mar. 4, 2022, which is hereby incorporated by reference in its entirety.

TECHNICAL FIELD

Embodiments described herein generally relate to systems and methods for object detection and, more specifically, to embodiments for utilizing a wireless communication system and an object proximity device on a vehicle to detect objects in the path of the vehicle.

BACKGROUND

Vehicles that operate in closed environments, such as warehouses are often required to maneuver and traverse tights spaces. Many of the vehicles being used in these types of environments include forklifts, trailers, and/or other components that may reduce the visibility of the user. As these vehicles are often very heavy, it can be difficult for the user to identify an object and to then maneuver around the object.

Current solutions may utilize vehicle-mounted systems, such as vision-based sensors, to provide advanced object detection and better visibility for a user. While these current solutions have improved object detection, these current solutions lack the ability to detect, alert, and avoid many objects that that the vehicle encounters in the environment. As such, a need in the industry exists for improved object detection.

SUMMARY

Systems and methods for object detection are described. A first aspect includes a system that includes a vehicle with a wireless communication receiver for receiving communication from a wireless communication transmitter that is placed on a first object and a computing device that includes a memory component and a processor. The memory component may store logic that causes the system to receive a communication from the wireless communication transmitter, receive proximity data related to a second object, and determine a second location of the second object. Some embodiments cause the system to determine a control zone along a current path of the vehicle based on a speed of the vehicle, and in response to determining that at least one of the following enters the control zone: the first object or the second object reduce the speed of the vehicle.

A second aspect includes the first aspect, wherein the wireless communication receiver and the at least one wireless communication transmitter are configured as at least one of the following: an ultra-wide band (UWB) system, a wireless fidelity system, or a Bluetooth® system.

A third aspect includes the first aspect and/or the second aspect, wherein the object proximity device includes at least one of the following: a 2-dimensional LiDAR system, a 3-dimensional LiDAR system a RADAR system, a SONAR system, or a camera system.

A fourth aspect includes any of the first aspect through the third aspect, wherein the computing device further causes the system to determine, based on at least one of the following: a wheel angle of the vehicle or the speed, a deceleration zone along the current path of the vehicle, wherein the deceleration zone is farther from the vehicle than the control zone.

A fifth aspect includes any of the first aspect through the fourth aspect, wherein the computing device further causes the system to, in response to determining that at least one of the following enters the control zone: the first object or the second object, reduce the speed to a second predetermined reduced speed, wherein the second predetermined reduced speed is greater than the first predetermined reduced speed.

A sixth aspect includes any of the first aspect through the fifth aspect, wherein the computing device further causes the system to determine, based on at least one of the following: the wheel angle or the speed, a proximity alert zone along the current path of the vehicle, wherein the proximity alert zone is farther from the vehicle than the control zone and the deceleration zone.

A seventh aspect includes any of the first aspect through the sixth aspect, wherein the computing device further causes the system to, in response to determining that at least one of the following enters the proximity alert zone: the first object or the second object, alert the user of the vehicle via a notification device on the vehicle.

An eighth aspect includes any of the first aspect through the seventh aspect, wherein the vehicle further includes a notification device for providing a user interface to the user.

A ninth aspect includes any of the first aspect through the eighth aspect, wherein the first object and the second object are one of the following: a common object or different objects.

A tenth aspect includes any of the first aspect through the ninth aspect, wherein in response to determining that the communication from the at least one wireless communication transmitter conflicts with the proximity data related to the second object, the computing device causes the system to determine which is more critical data and act on the more critical data.

An eleventh aspect includes a method that includes receiving, via a wireless communication receiver on the vehicle, a communication from at least one wireless communication transmitter in an environment, where the communication provides an identifier of a first object, determining, from the communication, a first location of the first object in the environment, and receiving from an object proximity device on the vehicle, proximity data related to a second object in the environment. Some embodiments include determining, from the proximity data, a second location of the second object, relative to a vehicle location in the environment, determining a speed of the vehicle, and determining, based at least on the speed, a control zone along a current path of the vehicle. In response to determining that at least one of the following enters the control zone: the first object or the second object, some embodiments automatically and without interaction from a user, reduce the speed of the vehicle to a first predetermined reduced speed.

A twelfth aspect may include the eleventh aspect, further comprising determining, based on at least one of the following: a wheel angle of the vehicle or the speed, a deceleration zone along the current path of the vehicle, wherein the deceleration zone is farther from the vehicle than the control zone.

A thirteenth aspect may include the eleventh aspect and/or twelfth aspect, further comprising, in response to determining that at least one of the following enters the control zone: the first object or the second object, reducing the speed to a second predetermined reduced speed, wherein the second predetermined reduced speed is greater than the first predetermined reduced speed.

A fourteenth aspect may include any of the eleventh aspect through the thirteenth aspect, further comprising determining, based on at least one of the following: the wheel angle or the speed, a proximity alert zone along the current path of the vehicle, wherein the proximity alert zone is farther from the vehicle than the control zone and the deceleration zone.

A fifteenth aspect may include any of the eleventh aspect through the fourteenth aspect, further comprising, in response to determining that at least one of the following enters the proximity alert zone: the first object or the second object, alert the user of the vehicle via a notification device on the vehicle.

A sixteenth aspect may include any of the eleventh aspect through the fifteenth aspect, wherein the first object and the second object are one of the following: a common object or different objects.

A seventeenth aspect may include any of the eleventh aspect through the sixteenth aspect, further comprising, in response to determining that the communication from the at least one wireless communication transmitter conflicts with the proximity data related to the second object, determining which is more critical data and acting on the more critical data.

An eighteenth aspect includes a computing device includes a processor and a memory component. The memory component may stores logic that, when executed by the processor, causes the computing device to receive, via a wireless communication receiver on the vehicle, a wireless communication from at least one wireless communication transmitter in an environment, where the wireless communication provides an identifier of a first object, determine a first location of the first object in the environment from the wireless communication, and receive from an object proximity device on the vehicle, proximity data related to a second object in the environment. Some embodiments cause the computing device to determine, from the proximity data, a second location of the second object, relative to a vehicle location in the environment, determine a speed of the vehicle, and determine, based at least on the speed, a control zone along a current path of the vehicle. In response to determining that at least one of the following enters the control zone: the first object or the second object, some embodiments may automatically and without user interaction, reduce the speed of the vehicle to a first predetermined reduced speed.

A nineteenth aspect includes the eighteenth aspect, wherein the first object and the second object are one of the following: a common object or different objects.

A twentieth aspect includes the eighteenth aspect and/or the nineteenth aspect, wherein the wireless communication receiver and the at least one wireless communication transmitter are configured as at least one of the following: an ultra-wide band (UWB) system, a wireless fidelity system, or a Bluetooth® system, wherein the object proximity device includes at least one of the following: a 2-dimensional LiDAR system, a 3-dimensional LiDAR system a RADAR system, a SONAR system, or a camera system.

Another aspect includes receiving a communication that provides an identifier of a first object; determining a first location of the first object in the environment; receiving proximity data related to a second object in the environment, determining a second location of the second object, determining a speed of the vehicle, determining an area of interest around a path of the vehicle, and reducing the speed of the vehicle to a first predetermined reduced speed.

Another aspect includes any of the previous aspects, further comprising dynamically changing the control zone, the deceleration zone, and/or the proximity zone, based on a change in the location, wheel angle, and/or speed of the vehicle.

Another aspect includes any of the previous aspects, further comprising creating a detection zone that represents an area where the object proximity device detects an object, but the location of the object does not provide enough probability of encountering the object to alter operation of the vehicle and/or alert the user of the vehicle.

Another aspect includes any of the previous aspects, further comprising, in response to detecting the object in the proximity alert zone, the vehicle may reduce a speed or a maximum speed until the object proximity device and/or the wireless communication receiver detects the object is no longer in the proximity alert zone.

Another aspect includes any of the previous aspects, further comprising, in response to determining that an object is located inside the deceleration zone, but the remote computing device determines that the object is traveling away from the vehicle 102 at a speed that would substantially reduce the likelihood that the vehicle would encounter the object, the remote computing device may override any alert or control signal to the vehicle.

Another aspect includes any of the previous aspects, further comprising predicting a future movement of the object.

Another aspect includes any of the previous aspects, further comprising, in response to detecting an object in an area of interest and determining a predicted direction of that object indicates that the object will be out of that area of interest at a time in the future, operating the vehicle as if the object is not in the detected area of interest.

Another aspect includes any of the previous aspects, further comprising, detecting an object in the deceleration zone, determining a projected direction of the object, and determining the projected direction of the object is out of the any identified zone within a predicted time that the vehicle will reach the object or other predetermined space, treating the object as if located in the detected zone.

Another aspect includes any of the previous aspects, further comprising determining that the current motion of the object reduces the likelihood that an alert or change in speed is warranted.

Another aspect includes any of the previous aspects, wherein the vehicle includes a first LiDAR device mounted on a front of the vehicle and a second LiDAR device mounted on a rear of the vehicle.

Another aspect includes any of the previous aspects, wherein the first LiDAR device detects objects in front of the vehicle when the vehicle is moving in a forward direction.

Another aspect includes the previous aspect, wherein the second LiDAR device detects objects in rear of the vehicle when the vehicle is moving in a rearward direction.

Another aspect includes any of the previous two aspects, wherein the vehicle may include an operator cage and a pair of forks for picking cargo within the manufacturing environment where the operator cage and forks may be raised and lowered to pick up cargo from shelves that are above the vehicle.

Another aspect includes any of the previous three aspects, wherein the second LiDAR device is mounted on a portion of the vehicle separate from the operator cage and forks that is not raised and lowered such that the second LiDAR device is disposed at a static distance away from the ground.

Another aspect includes any of the previous four aspects, wherein when the operator cage is lowered, the operator cage may obstruct the view of the second LiDAR device and the vehicle is configured to raise the operator cage to a predetermined height above the second LiDAR device when the vehicle is moving in the rearward direction so that the operator cage does not obstruct the view of the second LiDAR device.

Another aspect includes any of the previous aspects, further comprising defining a caution zone.

Another aspect includes the previous aspect, wherein the caution zone may be detected by the object proximity device and/or the wireless communication receiver.

Another aspect includes any of the previous two aspects, further comprising marking the caution zone as a location in the environment that is high traffic and thus, the vehicle should reduce speed when located in the caution zone.

Another aspect includes any of the previous three aspects, further comprising confirming that the vehicle is located within the caution zone, via a detection of markings that may be located in the caution zone.

Another aspect includes any of the previous aspects, wherein the object proximity device and/or the wireless communication receiver detect an object in an area of interest for the vehicle, and provides alerts and/or speed reductions to the vehicle.

Another aspect includes any of the previous aspects, further comprising defining an end of aisle zone.

Another aspect includes the previous aspect, further comprising causing the vehicle to reduce speed in the end of aisle zone due to a turn that the vehicle must take.

Another aspect includes the previous two aspects, wherein the caution zone includes at least one of the following: a high traffic zone, an end of aisle zone, a rough floor surface zone, a narrow aisle area zone, a pedestrian cross walk zone, a dock area zone, and a change in elevations zone such as ramps.

Another aspect includes any of the previous three aspects, wherein the caution is user-defined areas with user defined rules.

Another aspect includes any of the previous aspects, wherein the object proximity device and/or the wireless communication receiver always has priority.

Another aspect includes any of the previous aspects, further comprising receiving indication from the object proximity device and the wireless communication receiver related to the presence of an object, determining which identifies a more serious situation, and acting on the more serious situation.

Another aspect includes any of the previous aspects, further comprising ignoring object detection from the object proximity device and/or the wireless communication receiver based at least one of the following: user input, location, or type of object detected.

Another aspect includes any of the previous aspects, further comprising a user interface that provides at least one of the following: an object detection alert, a speed alert, or a text alert.

Another aspect includes the previous aspect, wherein the object detection alert may include a graphic or other indicator to alert the user where an object is located, relative to the vehicle.

Another aspect includes any of the previous two aspects, wherein the user interface and/or alert may change color, noise, and/or vibration depending on the proximity of the object, the direction of travel of the vehicle, and/or the location of the object.

Another aspect includes any of the previous three aspects, wherein the speed alert provide provides the user with information related the maximum speed of the vehicle.

Another aspect includes any of the previous aspects, wherein if an object enters a predetermined zone, the vehicle may automatically reduce the maximum and/or current speed of the vehicle.

Another aspect includes any of the previous aspects, wherein mobile wireless transmitters are permanently or temporarily coupled to mobile objects in the environment.

Another aspect includes any of the previous aspects, wherein the mobile wireless transmitter and/or computing device associated with the mobile transmitter may determine its own location in the environment.

Another aspect includes any of the previous aspects, further comprising detecting a second vehicle.

Another aspect includes of the previous aspect, further comprising determining areas of interest of the vehicle, as well as the second vehicle.

Another aspect includes any of the previous two aspects, further comprising, in response to determining that the areas of interest intersect, limiting the speed and/or provide providing an alert to one or more of the vehicle and/or the second vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for object detection. Some embodiments include an object detection system for materials handling vehicles. More particularly, some embodiments integrate an object proximity device (such as a LiDAR system, RADAR system, camera system, etc.) with a wireless communication system (such as an Ultra-Wide Band (UWB) system, Bluetooth® system, a wireless fidelity system, etc.) to detect and avoid objects and pedestrians in the proximity of the vehicle. Materials handling vehicles may include lift trucks, forklifts, pallet jacks, tow tractors, order pickers, etc.

A materials handling vehicle navigates an environment, such as a warehouse environment that includes objects, such as structures, pedestrians, and other vehicles, that the materials handling vehicle should avoid. However, an operator of the materials handling vehicle may be distracted or be unable to see the object. Accordingly, some embodiments are directed toward an object detection system that incorporates both a LiDAR system and a UWB system that intervenes in vehicle operation when an object is detected in an area of interest. The systems and methods for object detection incorporating the same will be described in more detail, below.

Figure 1:
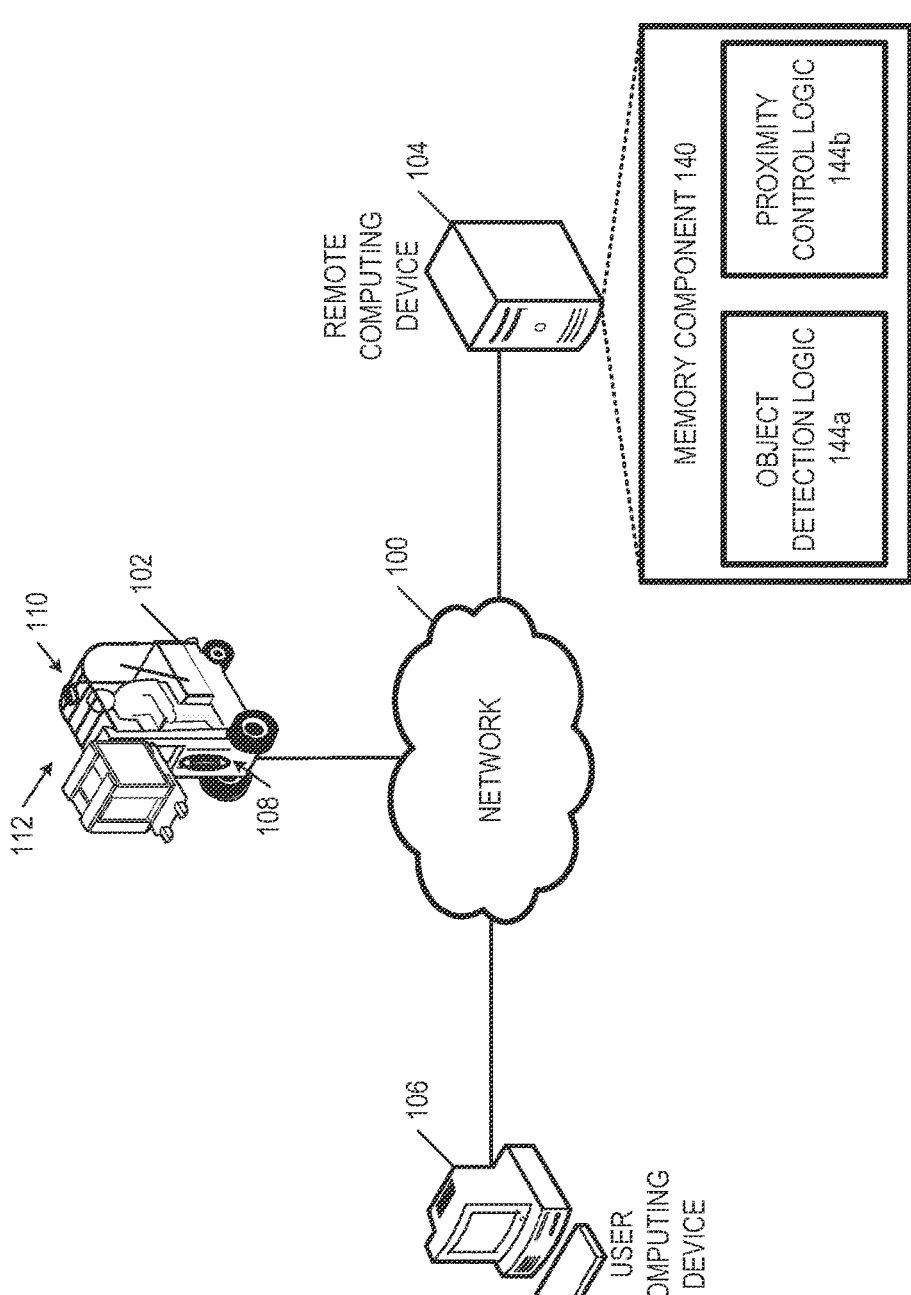
FIG. 1 depicts a computing environment for object detection, according to embodiments provided herein.

Referring now to the drawings, FIG. 1 depicts a computing environment for object detection, according to embodiments provided herein. As illustrated, the computing environment may include a network 100 coupled to a vehicle 102, a remote computing device 104, and/or a user computing device 106. The vehicle 102 may be configured as a materials handling vehicle or other vehicle that is configured to traverse an industrial area that includes objects, as described herein. The vehicle 102 may include an object proximity device 108 (or more than one) for detecting objects in the proximity of the vehicle 102. Depending on the particular embodiment, the object proximity device 108 may be configured as a 2-dimensional LiDAR system, a 3-dimensional LiDAR system a RADAR system, a SONAR system, a camera system, and/or other device or system that can detect the presence of objects in the proximity of the vehicle 102. In some embodiments, the vehicle 102 includes only one object proximity device 108, while some embodiments are configured such that a plurality of object proximity devices 108 are coupled to the vehicle 102 and provide a wide angle (e.g. 180 degree, 270 degree, 360 degree) view of objects around the vehicle 102.

Similarly, while some embodiments are configured to detect objects in proximity of the vehicle 102 via the object proximity device 108, some embodiments may be configured to acquire the environment data and construct a virtual representation of an area of the environment around the vehicle 102 from which the object is detected, as discussed with reference to FIGS. 4A-4C. As discussed in more detail below, these embodiments may utilize the object proximity device 108 and/or a wireless communication receiver 110.

The vehicle 102 may also include the wireless communication receiver 110 for communicating with a wireless communication transmitter 214 (FIG. 2) and/or with the remote computing device 104. As described in more detail below, some embodiments may be configured such that the environment has a plurality of wireless communication transmitters 214 positioned at known fixed locations and broadcast a signal that includes an identifier of that wireless communication transmitter 214. A vehicle computing device 112 on the vehicle 102 and/or the remote computing device 104 may then determine a current location of the vehicle 102 from the received wireless communication. Similarly, one or more wireless communication transmitters 214 may be positioned on moving objects in the environment. In these embodiments, the location of the wireless transmitters 214 may be determined and compared with the determined position of the vehicle 102.

Also included in FIG. 1 is the remote computing device 104. The remote computing device 104 may be configured as a personal computer, laptop, server, tablet, mobile device, vehicle computing device 112, and/or other computing device that includes the hardware and provides the functionality described herein. It should also be noted (and described in more detail below), that some embodiments may be configured such that the remote computing device 104 is configured as the vehicle computing device 112 that is integrated onto the vehicle 102.

Specifically, these embodiments may be configured such that the vehicle 102 and/or vehicle computing device 112 are equipped with a vehicle control module (VCM). The VCM may include a processor, input/output hardware, a memory component, data storage, etc., similar to described with reference to FIG. 6, as disclosed in U.S. Pat. No. 9,002,626 B2, which is hereby incorporated by reference in its entirety. The VCM may be utilized to receive data from the object proximity device 108 for detecting untagged objects in the environment. Some embodiments may be configured to receive information from the wireless communication receiver 110 for detecting tagged objects.

Regardless, the remote computing device 104 may include a plurality of components (described in more detail with reference to FIG. 6), such as a memory component 140. The memory component 140 may be configured as read access memory (RAM), read-only memory (ROM), registers, etc. The memory component 140 may be configured to store logic or other computer-readable instructions, such as object detection logic 144a and proximity control logic 144b. The object detection logic 144a may include instructions for receiving proximity data from the object proximity device 108 and processing that proximity data to determine a location (e.g., a first location, a second location, etc.) of an object, relative to the location of the vehicle 102. As an example, the object detection logic 144a may cause the remote computing device 104 to determine that an object is 30 cm from the front of the vehicle 102. In some embodiments, the object detection logic 144a may be configured to cause the remote computing device 104 to recognize the object as a pallet.

Some embodiments of the object detection logic 144a may access the wireless communication data received from a wireless transmitter. The wireless communication data may include an identifier of the wireless transmitter and/or other data such as object type of the object to which the wireless transmitter is coupled, footprint of object, update timing, speed, height, etc. It will be understood that the wireless communication receiver 110 may receive wireless communications from a plurality of wireless communication transmitters 214 at overlapping times. A first wireless communication transmitter 214 may be one of a plurality of fixed wireless communication transmitters that communicates an identifier that the object detection logic 144a may cause the remote computing device 104 to determine the location of the vehicle 102. This may include using data from a single wireless transmitter (e.g., location is known when signal strength reaches a maximum) and/or via triangulation communications from three or more of the fixed transmitters.

Similarly, wireless transmitters may be permanently or temporarily coupled to mobile objects 216 (such as another vehicle) in the environment ("mobile wireless transmitter" as used throughout). Depending on the particular embodiment, the mobile wireless transmitter (and/or computing device associated with the mobile transmitter) may determine its own location through the mechanisms described above. This information may be transmitted from the mobile wireless transmitter that is coupled to the mobile object 216 and received by the wireless communication receiver 110 on the vehicle 102. The object detection logic 144a may cause the remote computing device 104 to determine the location of the vehicle 102 and compare the location of the mobile object 216 with the location of the vehicle 102. Some embodiments may determine a location of the mobile object 216 by comparing signals received from the mobile object 216 with signals received from wireless communication transmitters 214 of stationary objects.

Also included in the memory component 140 is the proximity control logic 144*b*. The proximity control logic 144*b* may cause the remote computing device 104 to utilize the determined locations of mobile objects coupled to wireless communication transmitters 214, objects not coupled with wireless transmitters 124, and the vehicle 102 to determine whether an object is detected as being located within a control zone 440*a*, deceleration zone 440*b*, and/or proximity alert zone 440*c* of the vehicle 102, as described with reference to FIGS. 4A-4C. Some embodiments of the proximity control logic 144*b* may additionally create a control zone, a deceleration zone, and/or a proximity alert zone along the path of the vehicle 102, as described in more detail below.

Also included is a user computing device 106. The user computing device 106 may similarly be configured as a desktop computer, laptop, tablet, mobile device, etc. In some embodiments, the user computing device 106 may be configured to provide administrative viewing and controls of the vehicle 102 and/or remote computing device 104. Other administrative controls may also be provided, as described in U.S. Pat. No. 11,225,404 B2, which is hereby incorporated by reference, in its entirety.

It should be understood that some embodiments may be configured with the object proximity device 108 configured as a LiDAR system with one or more LiDAR devices. Each of the LiDAR devices may be a LiDAR scanner capable of detecting objects in a field of view of the LiDAR scanner, such as, for example, the SICK TiM781, the SICK microScan3, or the IDEC SE2L. The remote computing device 104 may receive signals from the LiDAR device indicative of the detected object. The LiDAR devices may be mounted in various locations on the vehicle 102 to detect objects around the vehicle 102, such as, for example, a front, a rear, a top, a side, or the like.

In some embodiments, the vehicle 102 may include a first LiDAR device mounted on a front of the vehicle 102 and a second LiDAR device mounted on a rear of the vehicle 102. The first LiDAR device may detect objects in front of the vehicle 102 when the vehicle 102 is moving in a forward direction. The second LiDAR device may detect objects in rear of the vehicle 102 when the vehicle 102 is moving in a rearward direction. The vehicle 102 may include an operator cage and a pair of forks for picking cargo within the manufacturing environment where the operator cage and forks may be raised and lowered to pick cargo from shelves that are above the vehicle 102. The second LiDAR device may be mounted on a portion of the vehicle 102 separate from the operator cage and forks that is not raised and lowered such that the second LiDAR device is disposed at a static distance away from the ground. When the operator cage is lowered, the operator cage may obstruct the view of the second LiDAR device. The vehicle 102 may be configured to raise the operator cage to a predetermined height above the second LiDAR device when the vehicle 102 is moving in the rearward direction so that the operator cage does not obstruct the view of the second LiDAR device.

Figure 2:
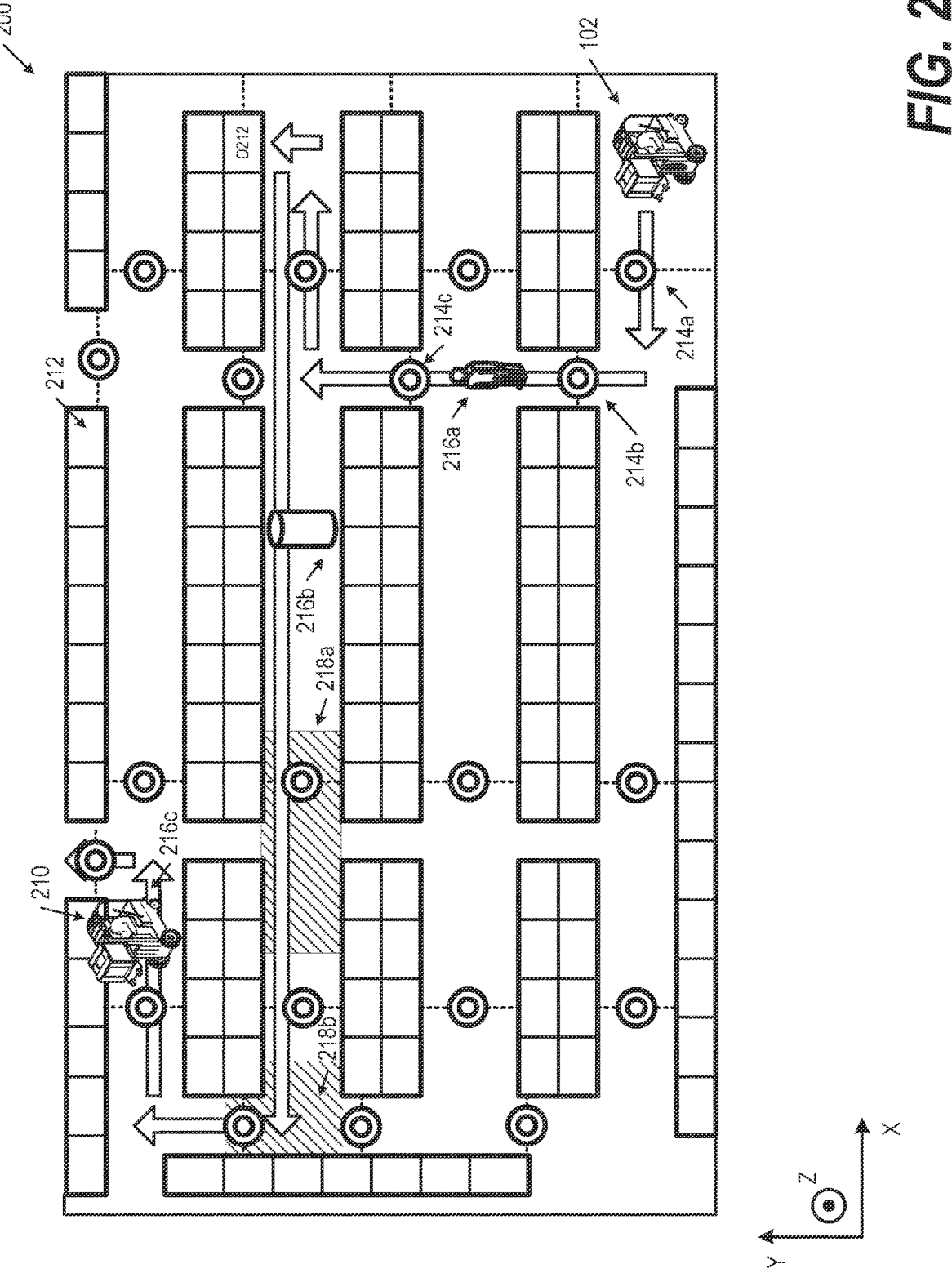
FIG. 2 depicts a vehicle traversing a route in an environment, according to embodiments provided herein.

FIG. 2 depicts a vehicle 102 traversing a route in an environment 200, according to embodiments provided herein. As illustrated, the environment 200 may include a plurality of objects, such as shelves 212 that define one or more aisles for the vehicle 102 to traverse. The environment 200 may additionally include a plurality of wireless communication transmitters 214 (e.g. wireless transmitter 214*a*, wireless transmitter 214*b*, and/or wireless transmitter 214*c*). As the wireless transmitters 214 are located in a fixed location (and/or coupled to a fixed object), the vehicle 102 may utilize data received from the wireless communication transmitters 214 to determine a location of the vehicle 102 in the environment 200. As such, the vehicle 102 may utilize the communication data to center the vehicle 102 in an aisle, as well as determine where in the environment 200 the vehicle 102 is located.

Also present in the environment 200 are mobile objects 216 (e.g., person 216*a*, barrel 216*b*, and second vehicle 216*c*). The mobile objects 216 may include any object that is configured to move (or could move) in the environment 200. In some embodiments, one or more of the mobile objects 216 are coupled with a mobile wireless transmitter 214*a*, while some objects are not tagged. As such, as the vehicle 102 traverses the environment 200 (e.g., via the path indicated by arrows), the vehicle 102 may encounter the person 216*a*. The person 216*a* may be coupled to a wireless transmitter 214*a* such that the wireless communication receiver 110 receives an identifier of the wireless transmitter 214*a*. The vehicle 102 may access information such as footprint (length and width in the x-y plane) of the person 216*a*, such that the vehicle 102 knows a safe path around the person 216*a*. This may provide planning for the vehicle 102, as the vehicle 102 approaches the person 216*a*. Additionally, the object proximity device 108 may be configured to detect the person 216*a* at closer range. With the combination of these two types of data, the vehicle 102 may determine an area of interest, such as a control zone, a deceleration zone, and/or a proximity alert zone, as described in more detail below.

As an example, the vehicle 102 may detect an object via the object proximity device 108. In some embodiments, the object proximity device 108 may report the object to the vehicle computing device 112 (and/or the remote computing device 104). The remote computing device 104 may additionally detect the object via the wireless communication receiver 110 because of a mobile wireless transmitter 214*a* that is coupled to the object. However, the vehicle computing device 112 may determine that the current motion of the object reduces the likelihood that an alert or change in speed is warranted.

Similarly, the vehicle 102 may encounter the barrel 216*b*, which may not have a wireless transmitter 214*a* coupled thereto. The wireless communication receiver 110 may be unable to detect the barrel 216*b*. Thus, the object proximity device 108 may be the sole mechanism for detecting the barrel 216*b*. After traversing past the barrel 216*b*, the vehicle 102 may encounter a caution zone, such as high traffic zone 218*a*, end of aisle zone 218*b*, a rough floor surface zone, a narrow aisle area zone, a pedestrian cross walk zone, a dock area zone, a change in elevations zone, such as ramps, and the like. The high traffic zone 218*a* may be detected by the object proximity device 108 (e.g., because the area is marked) and/or the wireless communication receiver 110. Specifically, the high traffic zone 218*a* may be marked by the remote computing device 104 as a location in the environment 200 that is high traffic and thus, the vehicle 102 should reduce speed when located in the high traffic zone 218*a*. The object proximity device 108 may confirm that the vehicle 102 is located within the high traffic zone 218*a*, via a detection of markings that may be located in the high traffic zone 218*a*. Further, should the object proximity device 108 and/or the wireless communication receiver 110 detect an object in an area of interest for the vehicle 102, further alerts and/or speed reductions may also be implemented.

Additionally, the environment 200 may include an end of aisle zone 218*b*. The end of aisle zone 218*b* may be configured similar to the high traffic zone 218*a*, except that the end of aisle zone 218*b* may cause the vehicle 102 to reduce speed due to a turn that the vehicle 102 must take. Specifically, facilities often have a rule that the vehicle 102 must come to a stop at the end of an aisle. If the operator does not come to a stop, the system will slow down the vehicle 102 so that it at least not traveling at full speed out of the aisle. As such, the high traffic zone 218*a* and/or the end of aisle zone 218*b* may be user-defined areas with user defined rules that are marked and/or identified to the remote computing device 104.

The vehicle 102 may additionally encounter a second vehicle 216*c*. The second vehicle 216*c* may include a wireless communication receiver 210 that may be utilized to determine its own location. This information may be communicated to the vehicle 102 such that the vehicle 102 may determine its location relative to the second vehicle 216*c*. The vehicle 102 may additionally use the object proximity device 108 to further determine the location of the second vehicle 216*c*.

It should be noted that the wireless communication transmitters 214 may be configured as transmitters and/or receivers (e.g., transceivers). As such the wireless communication transmitters 214 may include one or more hardware, software, and power to facilitate that functionality. Similarly, the wireless communication receiver 110 may be configured as a receiver and/or a transmitter, depending on the particular embodiment.

Figure 3:
FIG. 3 depicts a user interface that may be provided in the vehicle of FIG. 2, according to embodiments provided herein.

FIG. 3 depicts a user interface 330 that may be provided in the vehicle 102 of FIG. 2, according to embodiments provided herein. As illustrated, the user interface 330 may include an object detection alert 332, a speed alert 334, and a text alert 336. The object detection alert 332 may include a graphic or other indicator to alert the user where an object is located, relative to the vehicle 102. This alert may change color, noise, and/or vibration depending on the proximity of the object, the direction of travel of the vehicle 102, the location of the object, and/or other factors. The speed alert 334 may provide the user with information related the maximum speed of the vehicle 102. As described in more detail below, if an object enters a predetermined zone, the vehicle 102 may automatically reduce the maximum (or current) speed of the vehicle 102. Similarly, the text alert 336 may provide a textual indication of the alert(s) being provided, such as described in U.S. Pat. No. 10,430,073 B2, which is hereby incorporated by reference in its entirety.

Figures 4A, 4B, 4C:
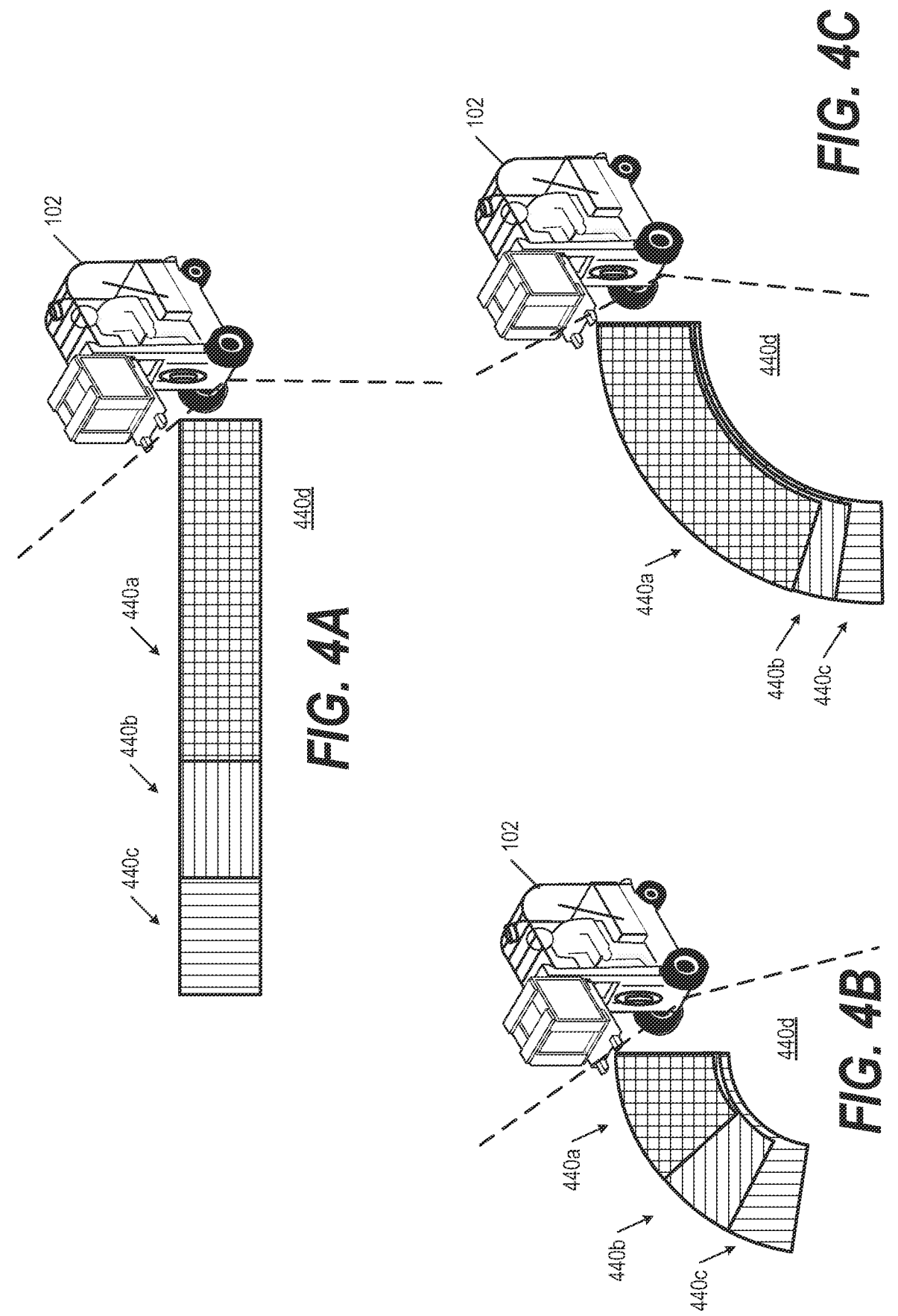
FIGS. 4A-4C depict areas of interest that may be determined for a vehicle, based on a speed and/or wheel position of the vehicle, according to embodiments provided herein.

FIGS. 4A-4C depict areas of interest that may be determined for a vehicle 102, based on a speed, wheel angle, predicted direction of the vehicle 102, a predetermined desired buffer zone between the vehicle 102 and an object, congestion of the area, and/or any combination thereof. As will be understood the areas of interest may be determined based on a probability of the vehicle 102 encountering an object. As an example, if the vehicle 102 is traveling at 5 miles per hour (about 7.3 feet per second) with zero wheel angle (i.e., the vehicle 102 is traveling straight), and the desired action for the control zone 440*a* is to stop the vehicle 102, the control zone 440*a* may be determined to be zero feet from the vehicle 102 to eight feet from the vehicle 102. Other areas of interest may be similarly determined.

As illustrated in FIG. 4A, the proximity control logic 144*b* may cause the vehicle 102 to create the control zone 440*a*, the deceleration zone 440*b*, the proximity alert zone 440*c*, and a detected zone 440*d*. The proximity control logic 144*b* may cause the vehicle 102 to determine an area that may require immediate action regarding the speed of the vehicle 102 as the control zone 440*a*. As an example, an administrator may determine that the control zone 440*a* is any area that would necessitate that the vehicle 102 reduce maximum speed to a set speed (e.g., 1 mile per hour, immediate stop, etc.), a percentage of maximum speed (e.g., 5% of maximum speed), and/or based on similar criteria. The vehicle 102 may also be configured to provide other actions when an object is detected in the control zone 440*a*, such as visible alarms, audio alarms, vibrational alarms, steering changes, etc.

The deceleration zone 440*b* may be configured to identify an area that is not as critical as the control zone 440*a*, but would engage speed control to the vehicle 102. Specifically, the deceleration zone 440*b* may define an area that causes the vehicle 102 to reduce speed (or maximum speed) to a level that is higher than the control zone 440*a*. While some embodiments may require only a change is speed, some embodiments may additionally provide alerts to a user of the vehicle 102 if an object is detected.

The proximity alert zone 440*c* may similarly be configured as a third tier zone that is least immediate of the three. Specifically, because the proximity alert zone 440*c* is situated farthest from the vehicle 102, the reaction of the vehicle 102 when an object enters the proximity alert zone 440*c* may be the mildest. In some embodiments, instead of altering operation of the vehicle 102, when an object enters the proximity alert zone 440*c*, the proximity control logic 144*b* may cause the vehicle 102 to provide one or more alerts to the user to indicate the presence of the object.

The detected zone 440*d* may be a fourth tier zone that represents an area where the object proximity device 108 detects an object, but the location of the object does not provide enough probability of encountering the object to alter operation of the vehicle 102 and/or alert the user of the vehicle 102. Thus, objects may be tracked by the object proximity device 108 before action is taken.

In operation, the remote computing device 104 may determine a location, wheel angle, and/or speed of the vehicle 102. With this information, the remote computing device 104 may create the control zone 440*a*, the deceleration zone 440*b*, and/or the proximity alert zone 440*c*. As will be understood, these areas of interest may dynamically change, as the location, wheel angle, and/or speed of the vehicle 102 changes. Additionally, the object proximity device 108 may detect an object in one of the areas of interest. In response to detecting the object in the proximity alert zone 440*c*, the vehicle 102 may reduce speed (or a maximum speed) until the object proximity device 108 and/or the wireless communication receiver 110 detects the object is no longer in the proximity alert zone 440*c*.

Some embodiments may predict a future movement of the object. As an example, if the vehicle 102 detects an object in an area of interest, but the predicted direction of that object would indicate that the object may be assumed to be out of that area of interest, the vehicle 102 may operate as if the object is not in the detected area of interest. As an example, if the vehicle 102 detects an object in the deceleration zone 440*b*, but the projected direction of the object is out of the any identified zone within a predicted time that the vehicle 102 will reach the object or other predetermined space, the vehicle 102 may treat the object as if located in the detected zone 440*d* and may take no corrective action. It should also be understood that some in embodiments, the remote computing device 104 processes data from the wireless transceivers to implement speed restrictions prior to the proximity detection.

Referring back to FIG. 2, the vehicle 102 may detect the second vehicle 216*c*. In such an embodiment, the remote computing device 104 may determine the areas of interest of the vehicle 102, as well as the second vehicle 216c. If the areas of interest intersect, the remote computing device 104 may limit the speed and/or provide an alert to one or more of the vehicle 102 and/or the second vehicle 216. As an example, if the vehicle 102 detects the second vehicle 216c in the deceleration zone 440b of the vehicle 102 and the second vehicle 216c detects the vehicle 102 in the control zone 440a of the second vehicle 216c, actions and/or alerts may be provided to both vehicles. Some embodiments, each vehicle takes the measures prescribed by identifying an object in the respective area of interest However, some embodiments may determine that since one of the vehicles (102, 216c) detects the other in the control zone 440a, both vehicles may be required to reduce speed according to the requirements of the control zone 440a.

Referring now to FIGS. 4B and 4C, it should be noted that the size and shape of the control zone 440a, the deceleration zone 440b, and/or the proximity alert zone 440c may change depending on the current (or maximum) speed of the vehicle 102 and/or a turning radius or wheel angle of the vehicle 102. Specifically FIG. 4B illustrates a sharp turn of the wheel of the vehicle 102, but the vehicle 102 speed may be slower than normal. As a result, the size and shape of the control zone 440a, the deceleration zone 440b, and/or the proximity alert zone 440c are reduced because the opportunity for encountering an object may be decreased. Thus, while a certain wheel angle or turning radius may cause one or more of the zones to increase in size and/or change shape, the speed may reduce the size to properly account for a probability of encountering an object. Further, FIG. 4C may represent the control zone 440a, the deceleration zone 440b, and/or the proximity alert zone 440c of a wheel angle with a higher speed than the embodiment of FIG. 4B. Referring back to FIG. 4A, the vehicle speed may be higher still.

It should be noted that while three zones are depicted in FIGS. 4A-4C, this is one embodiment. In some embodiments, fewer or more zones may be utilized with different functionalities. As an example, if the speed of the vehicle 102 or the probability of encountering an object is sufficiently low, only two the control zone 440a and the deceleration zone 440b may be utilized.

Additionally, while the control zone 440a, the deceleration zone 440b, and the proximity alert zone 440c are depicted in FIGS. 4A-4C, some embodiments may be configured such that the zones are not visible to the user. Similarly, some embodiments may be configured to depict the zones via a user interface, such as the user interface 330 from FIG. 3. Some embodiments still may utilize a projector and/or augmented reality provided by the vehicle 102 to provide the user with a visual depiction of the zones.

It should also be noted that embodiments may be configured to determine a direction and speed of an object and override and/or adjust any alerts provided. Specifically, if an object is located inside the deceleration zone 440b, but the remote computing device 104 determines that the object is traveling away from the vehicle 102 at a speed that would substantially reduce the likelihood that the vehicle 102 would encounter the object, the remote computing device 104 may override any alert or control signal to the vehicle 102.

Additionally, some embodiments may be configured to resolve conflicts between data received via the object proximity device 108 and the wireless communications receiver. Specifically, in response to determining that the communication from the wireless communication transmitter 214 conflicts with the proximity data related to an object, the remote computing device 104 may determine which is more critical data and act on the more critical data. Some embodiments may be configured such that the object proximity device 108 and/or the wireless communication receiver 110 always has priority. Some embodiments may determine that if either the object proximity device 108 or the wireless communication receiver 110 detects an object, the remote computing device 104 will always act on the most serious output (e.g., if the object proximity device 108 detects an object, but the wireless communication receiver 110 does not, the remote computing device 104 will assume the object proximity device 108 is correct and will act accordingly). Some embodiments may be configured to discount or ignore object detection from the object proximity device 108 and/or the wireless communication receiver 110 based on one or more predetermined criteria (e.g., user input, location, type of object detected, etc.).

Figure 5:
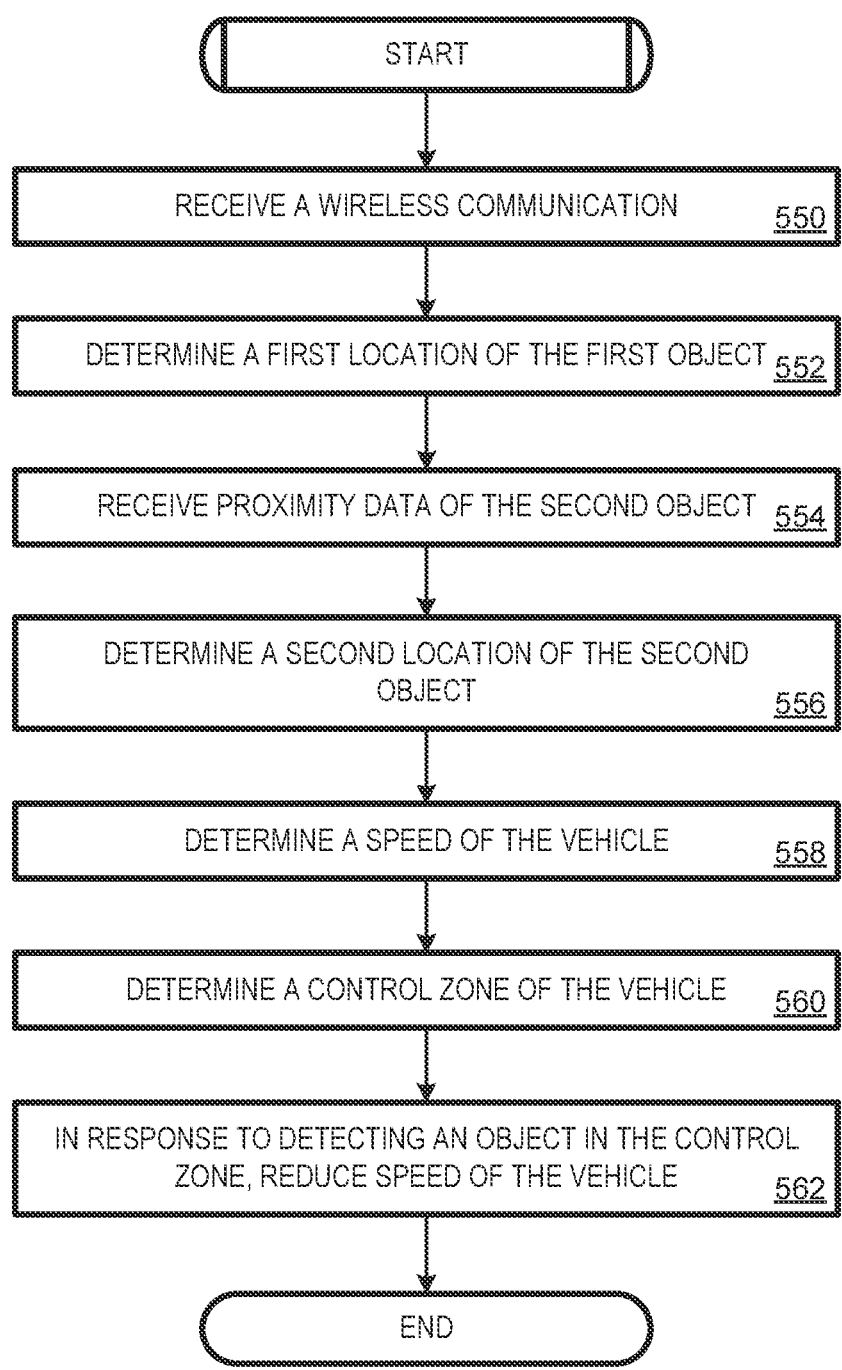
FIG. 5 depicts a flowchart for object detection, according to embodiments provided herein.

FIG. 5 depicts a flowchart for object detection, according to embodiments provided herein. As illustrated in block 550, a communication from at least one wireless communication transmitter 214 in an environment 200 may be received. In some embodiments, the communication provides an identifier of a first object. Still some embodiments may provide additional information, such as object type of the object to which the wireless transmitter 214a is coupled, footprint of object, update timing, speed, height, etc. In block 552, a first location of the first object in the environment 200 may be determined from the communication. In block 554, proximity data related to a second object in the environment 200 may be received from an object proximity device 108 on the vehicle 102. In block 556, a second location of the second object, relative to a vehicle 102 location in the environment 200 may be determined from the proximity data. In block 558, a speed of the vehicle 102 may be determined. In block 560, a control zone 440a along a current path of the vehicle 102 may be determined based at least on the speed of the vehicle 102. In block 562, in response to determining that the first object and/or the second object enters the control zone 440a, the speed of the vehicle 102 may be reduced to a first predetermined reduced speed automatically and without interaction from a user.

Figure 6:
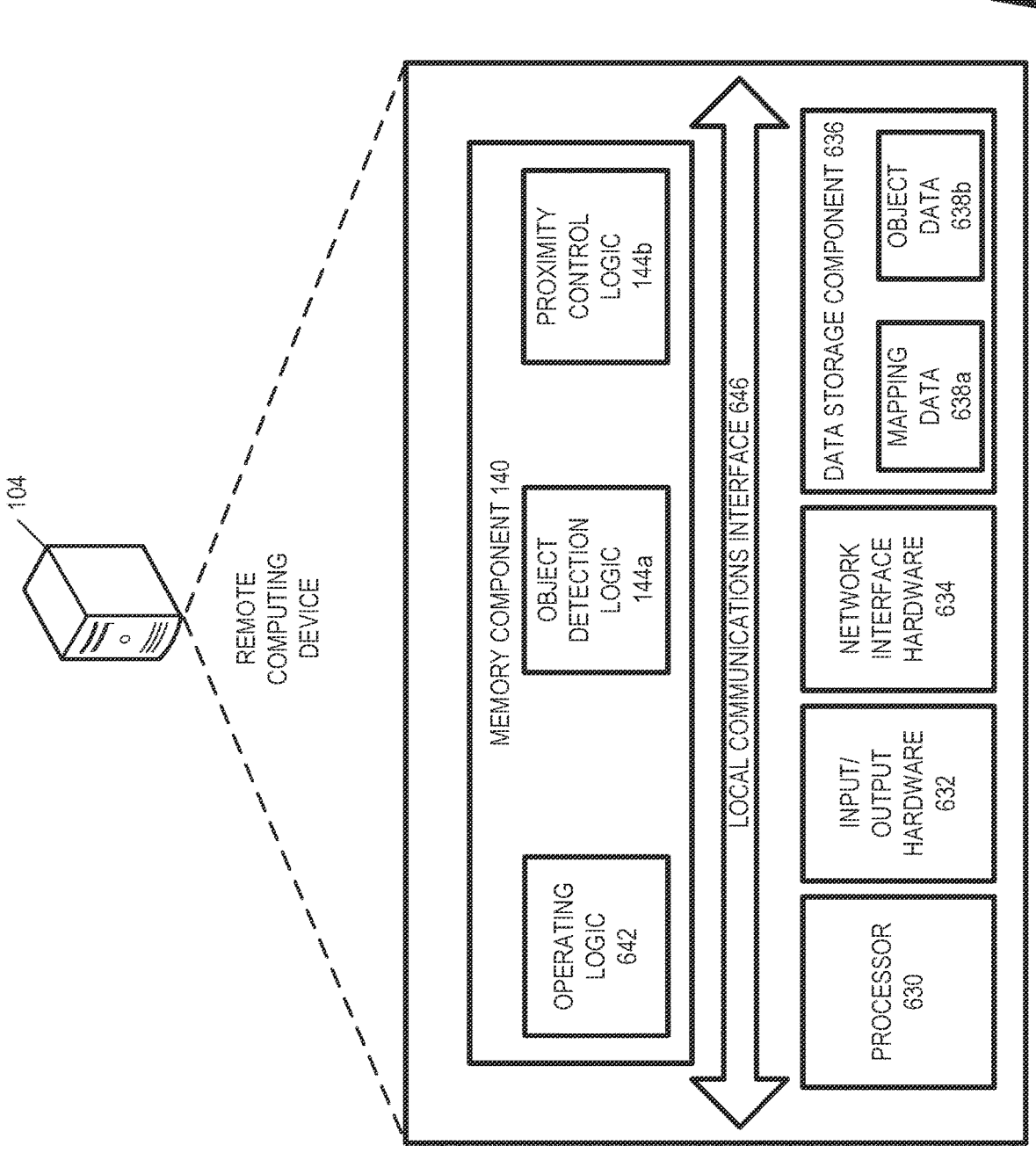
FIG. 6 depicts the remote computing device of FIG. 1, according to embodiments provided herein.

FIG. 6 depicts the remote computing device 104 device of FIG. 1, according to embodiments provided herein. As illustrated, the remote computing device 104 includes a processor 630, input/output hardware 632, a network interface hardware 634, a data storage component 636 (which stores mapping data 638a, object data 638b, and/or other data), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the remote computing device 104 and/or external to the remote computing device 104.

The memory component 140 may store operating logic 642, the object detection logic 144a, and the proximity control logic 144b. Each of these logic components may include a plurality of different pieces of logic, each of which may be embodied as a computer program, firmware, and/or hardware, as an example. A local interface 646 is also included in FIG. 6 and may be implemented as a bus or other communication interface to facilitate communication among the components of the remote computing device 104.

The processor 630 may include any processing component operable to receive and execute instructions (such as from a data storage component 636 and/or the memory component 140). As described above, the input/output hardware 632 may include and/or be configured to interface with speakers, microphones, and/or other input/output components.

The network interface hardware 634 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 104 and other computing devices.

The operating logic 642 may include an operating system and/or other software for managing components of the remote computing device 104. As discussed above, the object detection logic 144a may reside in the memory component 140 and may be configured to cause the processor 630 to determine locations of objects in the environment 200, as described herein. The proximity control logic 144b may be configured to cause the processor 630 to provide the alerts, zones, and/or vehicle control associated with detected objects.

It should be understood that while the components in FIG. 6 are illustrated as residing within the remote computing device 104, this is merely an example. In some embodiments, one or more of the components may reside external to the remote computing device 104 or within other devices, such as the vehicle 102 and/or the user computing device 106 depicted in FIG. 1. It should also be understood that, while the remote computing device 104 is illustrated as a single device, this is also merely an example. In some embodiments, the object detection logic 144a and the proximity control logic 144b may reside on different computing devices.

As an example, one or more of the functionalities and/or components described herein may be provided by the remote computing device 104, the vehicle 102, and/or the user computing device 106. Depending on the particular embodiment, any of these devices may have similar components as those depicted in FIG. 6. To this end, any of these devices may include logic for performing the functionality described herein.

Additionally, while the remote computing device 104 is illustrated with the object detection logic 144a and the proximity control logic 144b as separate logical components, this is also an example. In some embodiments, a single piece of logic may provide the described functionality. It should also be understood that while the object detection logic 144a and the proximity control logic 144b are described herein as the logical components, this is also an example. Other components may also be included, depending on the embodiment.

As illustrated above, various embodiments of systems and methods for object detection are disclosed. These embodiments may be configured to identify and navigate around objects in an environment 200, regardless of whether the object has been previously identified and/or located. Similarly, some embodiments may be configured to mesh both proximity data from an object proximity device 108 with a communication from a wireless communication transmitter 214.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for systems and methods for object detection. It should also be understood that these embodiments are merely exemplary and are not intended to limit the scope of this disclosure.

What is claimed is:

1. A system for object detection in an environment, comprising:

a vehicle that includes a steering wheel having a wheel angle and a wireless communication receiver for receiving a communication from a plurality of wireless communication transmitters, wherein at least one of the plurality of wireless communication transmitters is fixed in the environment, wherein at least one of the plurality of communication transmitters is placed on a first object in the environment and an object proximity device that captures proximity data related to a second object that is in proximity with the vehicle, wherein the wireless communication receiver receives data from a plurality of fixed wireless communication transmitters in the environment for determining a vehicle location of the vehicle in the environment;

a computing device that includes a memory component and a processor, wherein the memory component stores logic that, when executed by the computing device, causes the system to perform at least the following:

receive, via the wireless communication receiver, the communication from the at least one wireless communication transmitter, wherein the communication includes an identifier of an object and a first location of the first object in the environment;

determine the vehicle location of the vehicle in the environment from the communication via the wireless communication receiver;

receive, from the object proximity device, the proximity data related to the second object;

determine, from the proximity data, a second location of the second object, relative to the vehicle location;

determine a speed of the vehicle;

determine a control zone along a current path of the vehicle, wherein a size and shape of the control zone are based on the vehicle location of the vehicle in the environment determined via the wireless communication receiver, the speed of the vehicle, and the wheel angle, wherein the size and shape of the control zone are configured to dynamically change, based on at least one of the following: a change in location, a change in wheel angle, or the change in speed of the vehicle;

in response to determining that at least one of the following enters the control zone: the first object detected by the wireless communication receiver or the second object detected by the object proximity device, automatically and without interaction from a user, reduce the speed of the vehicle to a first predetermined reduced speed; and in response to detecting at least one of the following: the first object or the second object are in the control zone and determining that a predicted direction of that object indicates that the object will be out of the control zone at a time in the future, operating the vehicle as if the object is not in the control zone.

2. The system of claim 1, wherein the wireless communication receiver and the at least one wireless communication transmitter are configured as at least one of the following: an ultra-wide band (UWB) system, a wireless fidelity system, or a short range peer-to-peer system.

3. The system of claim 1, wherein the object proximity device includes at least one of the following: a 2-dimensional LiDAR system, a 3-dimensional LiDAR system a RADAR system, a SONAR system, or a camera system.

4. The system of claim 1, wherein the computing device further causes the system to determine, based on at least one of the following: the wheel angle of the vehicle or the speed, a deceleration zone along the current path of the vehicle, wherein the deceleration zone is farther from the vehicle than the control zone.

5. The system of claim 4, wherein the computing device further causes the system to, in response to determining that at least one of the following enters the control zone: the first object or the second object, reduce the speed to a second predetermined reduced speed, wherein the second predetermined reduced speed is greater than the first predetermined reduced speed.

6. The system of claim 5, wherein the computing device further causes the system to determine, based on at least one of the following: the wheel angle or the speed, a proximity alert zone along the current path of the vehicle, wherein the proximity alert zone is farther from the vehicle than the control zone and the deceleration zone.

7. The system of claim 6, wherein the computing device further causes the system to, in response to determining that at least one of the following enters the proximity alert zone: the first object or the second object, alert the user of the vehicle via a notification device on the vehicle.

8. The system of claim 1, wherein the vehicle further includes a notification device for providing a user interface to the user.

9. The system of claim 1, wherein the first object and the second object are one of the following: a common object or different objects.

10. The system of claim 1, wherein in response to determining that the communication from the at least one wireless communication transmitter conflicts with the proximity data related to the second object, the computing device causes the system to determine which is more critical data and act on the more critical data.

11. A method for object detection for a vehicle, comprising:

receiving, via a wireless communication receiver on the vehicle, a communication from at least one wireless communication transmitter in an environment, wherein the communication provides an identifier of a first object;

determining, from the communication, a first location of the first object in the environment;

determining a vehicle location of the vehicle in the environment from the communication via the wireless communication receiver;

receiving from an object proximity device on the vehicle, proximity data related to a second object in the environment;

determining, from the proximity data, a second location of the second object, relative to the vehicle location in the environment;

determining a speed of the vehicle;

determining a control zone along a current path of the vehicle, wherein a size and shape of the control zone are determined based on the vehicle location of the vehicle in the environment determined via the wireless communication receiver, the speed of the vehicle, and a wheel angle of a steering wheel of the vehicle, wherein the size and shape of the control zone are configured to dynamically change, based on at least one of the following: a change in location, a change in wheel angle, or the change in speed of the vehicle;

in response to determining that at least one of the following enters the control zone: the first object or the second object, automatically and without interaction from a user, reducing the speed of the vehicle to a first predetermined reduced speed; and in response to detecting at least one of the following: the first object or the second object are in the control zone and determining that a predicted direction of that object indicates that the object will be out of the control zone at a time in the future, operating the vehicle as if the object is not in the control zone.

12. The method of claim 11, further comprising determining, based on at least one of the following: the wheel angle of the vehicle or the speed, a deceleration zone along the current path of the vehicle, wherein the deceleration zone is farther from the vehicle than the control zone.

13. The method of claim 12, further comprising, in response to determining that at least one of the following enters the control zone: the first object or the second object, reducing the speed to a second predetermined reduced speed, wherein the second predetermined reduced speed is greater than the first predetermined reduced speed.

14. The method of claim 13, further comprising determining, based on at least one of the following: the wheel angle or the speed, a proximity alert zone along the current path of the vehicle, wherein the proximity alert zone is farther from the vehicle than the control zone and the deceleration zone.

15. The method of claim 14, further comprising, in response to determining that at least one of the following enters the proximity alert zone: the first object or the second object, alert the user of the vehicle via a notification device on the vehicle.

16. The method of claim 11, wherein the first object and the second object are one of the following: a common object or different objects.

17. The method of claim 11, further comprising, in response to determining that the communication from the at least one wireless communication transmitter conflicts with the proximity data related to the second object, determining which is more critical data and acting on the more critical data.

18. A computing device for object detection for a vehicle, comprising:

a processor; and a memory component, that stores logic that, when executed by the processor, causes the computing device to perform at least the following:

receive, via a wireless communication receiver on the vehicle, a wireless communication from at least one wireless communication transmitter in an environment, wherein the wireless communication provides an identifier of a first object;

determine a first location of the first object in the environment from the wireless communication;

determine a vehicle location of the vehicle in the environment from the communication via the wireless communication receiver;

receive from an object proximity device on the vehicle, proximity data related to a second object in the environment;

determine, from the proximity data, a second location of the second object, relative to the vehicle location in the environment;

determine a speed of the vehicle;

determine, based at least on the vehicle location of the vehicle in the environment determined via the wireless communication receiver, the speed of the vehicle, and a wheel angle of a steering wheel of the vehicle, a control zone along a current path of the vehicle, wherein the size and shape of the control zone are configured to dynamically change, based on at least one of the following: a change in location, a change in wheel angle, or the change in speed of the vehicle;

in response to determining that at least one of the following enters the control zone: the first object or the second object, automatically and without user interaction, reduce the speed of the vehicle to a first predetermined reduced speed; and in response to detecting at least one of the following: the first object or the second object are in the control zone and determining that a predicted direction of that object indicates that the object will be out of the control zone at a time in the future, operate the vehicle as if the object is not in the control zone.

19. The computing device of claim 18, wherein the first object and the second object are one of the following: a common object or different objects.

20. The computing device of claim 18, wherein the wireless communication receiver and the at least one wireless communication transmitter are configured as at least one of the following: an ultra-wide band (UWB) system, a wireless fidelity system, or a short range peer-to-peer system, wherein the object proximity device includes at least one of the following: a 2-dimensional LiDAR system, a 3-dimensional LiDAR system a RADAR system, a SONAR system, or a camera system.

\* \* \* \* \*